(12) United States Patent
Kyo

(10) Patent No.: US 7,783,861 B2
(45) Date of Patent: Aug. 24, 2010

(54) DATA REALLOCATION AMONG PES CONNECTED IN BOTH DIRECTIONS TO RESPECTIVE PES IN ADJACENT BLOCKS BY SELECTING FROM INTER-BLOCK AND INTRA BLOCK TRANSFERS

(75) Inventor: Shorin Kyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/224,561

(22) PCT Filed: Feb. 27, 2007

(86) PCT No.: PCT/JP2007/053633

§ 371 (c)(1),
(2), (4) Date: Aug. 29, 2008

(87) PCT Pub. No.: WO2007/099950

PCT Pub. Date: Sep. 7, 2007

(65) Prior Publication Data

US 2009/0043986 A1 Feb. 12, 2009

(30) Foreign Application Priority Data

Mar. 3, 2006 (JP) .............................. 2006-058302

(51) Int. Cl.
*G06F 15/163* (2006.01)
(52) U.S. Cl. .......................................... 712/11; 712/29
(58) Field of Classification Search ........................ None
See application file for complete search history.

(56) References Cited

U.S. PATENT DOCUMENTS 5,129,092 A * 7/1992 Wilson ........................ 712/16

(Continued)

FOREIGN PATENT DOCUMENTS

JP 01-004856 1/1989

(Continued)

OTHER PUBLICATIONS

S. Kyo et al., A Video Recognition Processor for Intelligent Cruise Control Based on 128 4-Way VLIW RISC Processing Elements, IEICE Technical Report ICD2003-29, May 29, 2003, pp. 19-24.

(Continued)

*Primary Examiner*—Kenneth S Kim
(74) *Attorney, Agent, or Firm*—Foley & Lardner LLP

(57) ABSTRACT

When an instruction code "MVLR" is sent from a control processor in a PE having a mask register MR in operation setting, when the direction register F is ON, if a counter and transfer result storing buffer T is $\geq M$, a value of T−M is stored in buffer T, and if T is less than M, content of a first transport register L of a PE whose PE number counted from the left inside a PE block is T, is selected by a first selector and stored in buffer T and the mask register is set to non-operation. When the direction register is OFF, if T is $\leq -M$, a value of T+M is stored in buffer T, and if T is greater than −M, content of R of a PE whose PE number is −T, counted from the right inside the PE block, is selected by a second selector and stored in buffer T, and MR is set to non-operation. Entire PEs transfer content of L and R to M-adjacent left and right PEs, and data transferred from M-adjacent right and M-adjacent left PEs are stored in L and R respectively.

14 Claims, 12 Drawing Sheets

U.S. PATENT DOCUMENTS

| | | |
|---|---|---|
| 5,471,580 A | 11/1995 | Fujiwara et al. |
| 5,504,918 A | 4/1996 | Collette et al. |
| 7,196,708 B2 * | 3/2007 | Dorojevets et al. .......... 345/502 |
| 2006/0041715 A1 | 2/2006 | Chrysos et al. |

FOREIGN PATENT DOCUMENTS

| | | |
|---|---|---|
| JP | 03-256159 | 11/1991 |
| JP | 04-113444 | 4/1992 |
| JP | 05-204876 | 8/1993 |
| JP | 05-342184 | 12/1993 |
| JP | 06-509671 | 10/1994 |
| JP | 2006-012133 A | 1/2006 |

OTHER PUBLICATIONS

S. Kyo, IMAP-CE: A video recognition processor with 128 VLIW Processing Elements, Computer Architecture 149-7, Aug. 22, 2002, pp. 37-42.

* cited by examiner

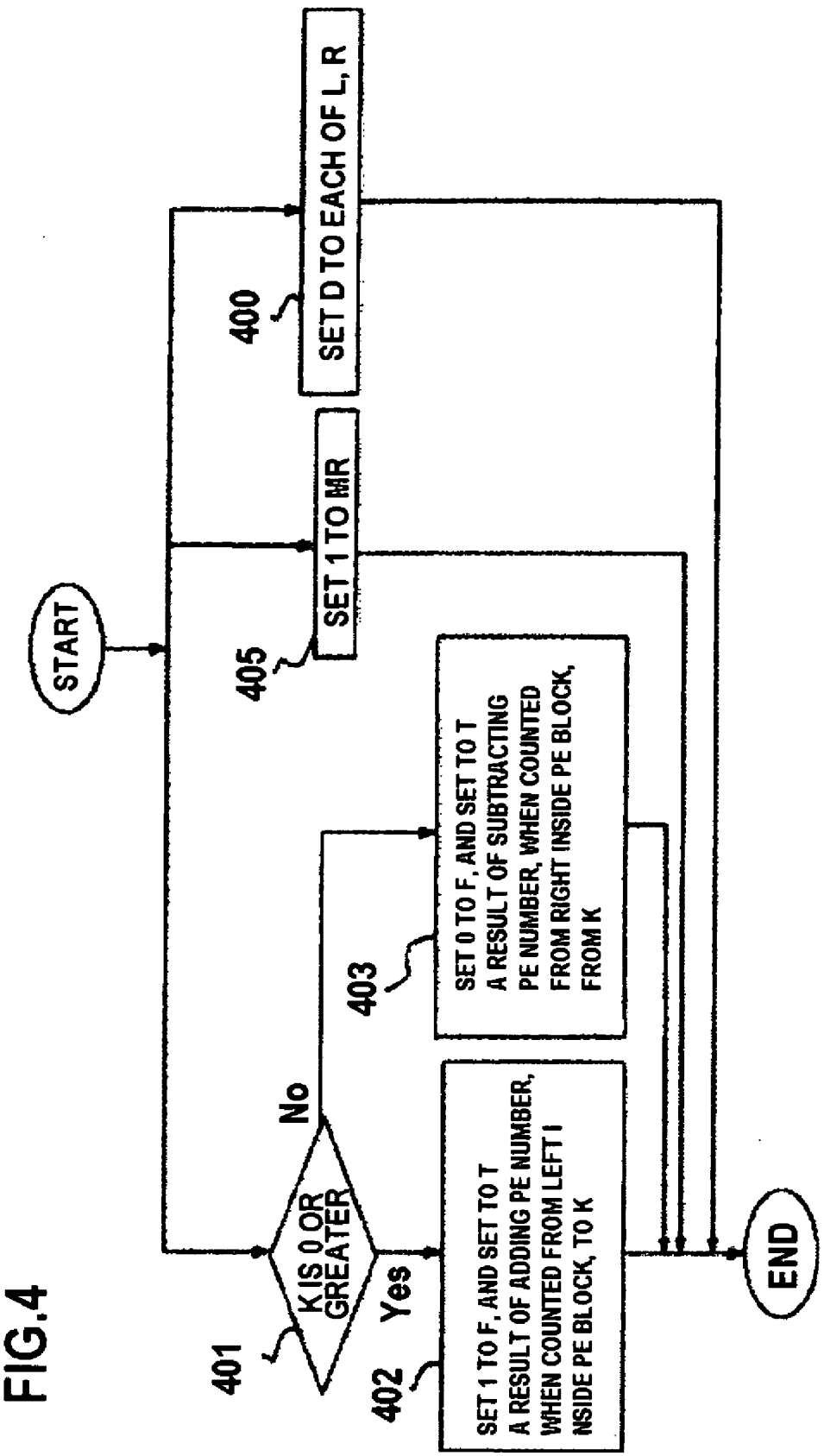

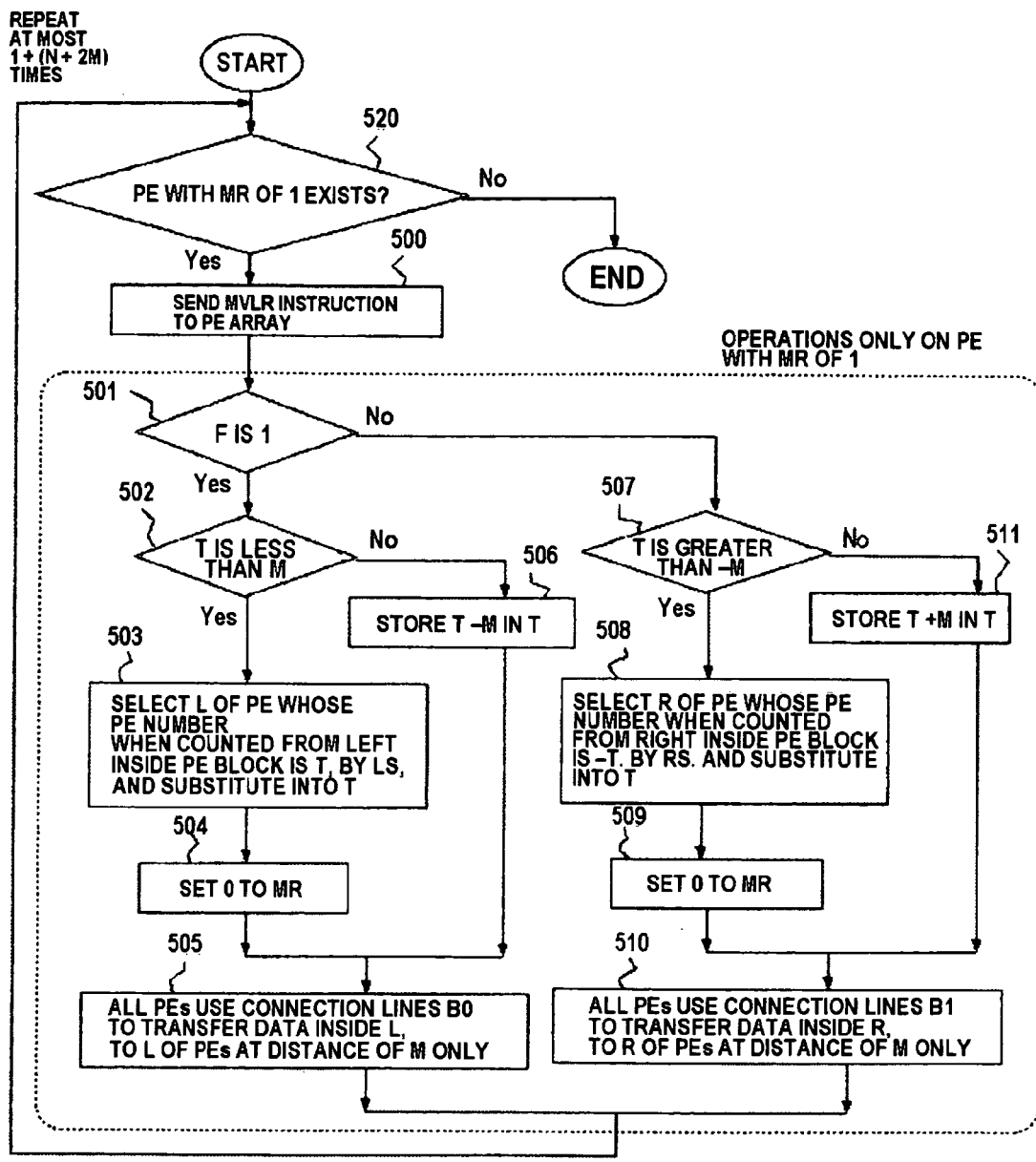

FIG.6A
IMMEDIATELY AFTER MVSET INSTRUCTION EXECUTION

| PE# (OVERALL PE NUMBER) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE# FROM RIGHT INSIDE BLOCK | 3 | 2 | 1 | 0 | 3 | 2 | 1 | 0 | 3 | 2 | 1 | 0 | 3 | 2 | 1 | 0 |
| PE# FROM LEFT INSIDE BLOCK | 0 | 1 | 2 | 3 | 0 | 1 | 2 | 3 | 0 | 1 | 2 | 3 | 0 | 1 | 2 | 3 |
| K | -3 | -7 | 2 | 0 | 4 | -5 | -8 | -1 | 3 | 2 | 7 | 0 | 4 | 1 | 6 | -6 |
| F | 0 | 0 | 1 | 1 | 1 | 0 | 0 | 0 | 1 | 1 | 1 | 1 | 1 | 1 | 1 | 0 |
| T | -6 | -9 | 4 | 3 | 4 | -7 | -8 | -1 | 3 | 3 | 9 | 3 | 4 | 2 | 8 | -6 |
| L | 0 | 1 | 2 | 3 | 4 | 5 | 6 | 7 | 8 | 9 | 10 | 11 | 12 | 13 | 14 | 15 |
| R | 0 | 1 | 2 | 3 | 4 | 5 | 6 | 7 | 8 | 9 | 10 | 11 | 12 | 13 | 14 | 15 |
| MR | 1 | 1 | 1 | 1 | 1 | 1 | 1 | 1 | 1 | 1 | 1 | 1 | 1 | 1 | 1 | 1 |

FIG.6B
FIRST MVLR INSTRUCTION (BEFORE UPDATING L, R)

| PE# (OVERALL PE NUMBER) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE# FROM RIGHT INSIDE BLOCK | 3 | 2 | 1 | 0 | 3 | 2 | 1 | 0 | 3 | 2 | 1 | 0 | 3 | 2 | 1 | 0 |
| PE# FROM LEFT INSIDE BLOCK | 0 | 1 | 2 | 3 | 0 | 1 | 2 | 3 | 0 | 1 | 2 | 3 | 0 | 1 | 2 | 3 |
| K | -3 | -7 | 2 | 0 | 4 | -5 | -8 | -1 | 3 | 2 | 7 | 0 | 4 | 1 | 6 | -6 |
| F | 0 | 0 | 1 | 1 | 1 | 0 | 0 | 0 | 1 | 1 | 1 | 1 | 1 | 1 | 1 | 0 |
| T | -2 | -5 | 0 | 3 | 0 | -3 | -5 | 6 | 11 | 11 | 5 | 11 | 0 | 14 | 4 | -2 |
| L | 0 | 1 | 2 | 3 | 4 | 5 | 6 | 7 | 8 | 9 | 10 | 11 | 12 | 13 | 14 | 15 |
| R | 0 | 1 | 2 | 3 | 4 | 5 | 6 | 7 | 8 | 9 | 10 | 11 | 12 | 13 | 14 | 15 |
| MR | 1 | 1 | 1 | 0 | 1 | 1 | 1 | 0 | 0 | 0 | 1 | 0 | 1 | 0 | 1 | 1 |

FIG.6C
SECOND MVLR INSTRUCTION (BEFORE UPDATING L, R)

| PE# (OVERALL PE NUMBER) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE# FROM RIGHT INSIDE BLOCK | 3 | 2 | 1 | 0 | 3 | 2 | 1 | 0 | 3 | 2 | 1 | 0 | 3 | 2 | 1 | 0 |
| PE# FROM LEFT INSIDE BLOCK | 0 | 1 | 2 | 3 | 0 | 1 | 2 | 3 | 0 | 1 | 2 | 3 | 0 | 1 | 2 | 3 |
| K | -3 | -7 | 2 | 0 | 4 | -5 | -8 | -1 | 3 | 2 | 7 | 0 | 4 | 1 | 6 | -6 |
| F | 0 | 0 | 1 | 1 | 1 | 0 | 0 | 0 | 1 | 1 | 1 | 1 | 1 | 1 | 1 | 0 |
| T | 13 | -1 | 4 | 3 | 8 | 0 | -1 | 6 | 11 | 11 | 1 | 11 | 0 | 14 | 0 | 8 |
| L | 4 | 5 | 6 | 7 | 8 | 9 | 10 | 11 | 12 | 13 | 14 | 15 | 0 | 1 | 2 | 3 |
| R | 12 | 13 | 14 | 15 | 0 | 1 | 2 | 3 | 4 | 5 | 6 | 7 | 8 | 9 | 10 | 11 |
| MR | 0 | 1 | 0 | 0 | 0 | 0 | 1 | 0 | 0 | 0 | 1 | 0 | 0 | 0 | 1 | 0 |

FIG.6D

THIRD MVLR INSTRUCTION (BEFORE UPDATING L, R)

| PE# (OVERALL PE NUMBER) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE# FROM RIGHT INSIDE BLOCK | 3 | 2 | 1 | 0 | 3 | 2 | 1 | 0 | 3 | 2 | 1 | 0 | 3 | 2 | 1 | 0 |
| PE# FROM LEFT INSIDE BLOCK | 0 | 1 | 2 | 3 | 0 | 1 | 2 | 3 | 0 | 1 | 2 | 3 | 0 | 1 | 2 | 3 |
| K | -3 | -7 | 2 | 0 | 4 | -5 | -8 | -1 | 3 | 2 | 7 | 0 | 4 | 1 | 6 | -6 |
| F | 0 | 0 | 1 | 1 | 1 | 0 | 0 | 0 | 1 | 1 | 1 | 1 | 1 | 1 | 1 | 0 |
| T | 13 | 10 | 4 | 3 | 8 | 0 | 14 | 6 | 11 | 11 | 1 | 11 | 0 | 14 | 4 | 9 |
| L | 8 | 9 | 10 | 11 | 12 | 13 | 14 | 15 | 0 | 1 | 2 | 3 | 4 | 5 | 6 | 7 |
| R | 8 | 9 | 10 | 11 | 12 | 13 | 14 | 15 | 0 | 1 | 2 | 3 | 4 | 5 | 6 | 7 |
| MR | 0 | 0 | 0 | 0 | 0 | 0 | 0 | 0 | 0 | 0 | 0 | 0 | 0 | 0 | 0 | 0 |

FIG.6E

STATE AT TERMINATION (CORRESPONDING TO THIRD MVLR INSTRUCTION AND AFTER UPDATING L, R)

| PE# (OVERALL PE NUMBER) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PE# FROM RIGHT INSIDE BLOCK | 3 | 2 | 1 | 0 | 3 | 2 | 1 | 0 | 3 | 2 | 1 | 0 | 3 | 2 | 1 | 0 |
| PE# FROM LEFT INSIDE BLOCK | 0 | 1 | 2 | 3 | 0 | 1 | 2 | 3 | 0 | 1 | 2 | 3 | 0 | 1 | 2 | 3 |
| K | -3 | -7 | 2 | 0 | 4 | -5 | -8 | -1 | 3 | 2 | 7 | 0 | 4 | 1 | 6 | -6 |
| F | 0 | 0 | 1 | 1 | 1 | 0 | 0 | 0 | 1 | 1 | 1 | 1 | 1 | 1 | 1 | 0 |
| T | 13 | 10 | 4 | 3 | 8 | 0 | 14 | 6 | 11 | 11 | 1 | 11 | 0 | 14 | 4 | 9 |
| L | 12 | 13 | 14 | 15 | 0 | 1 | 2 | 3 | 4 | 5 | 6 | 7 | 8 | 9 | 10 | 11 |
| R | 4 | 5 | 6 | 7 | 8 | 9 | 10 | 11 | 12 | 13 | 14 | 15 | 0 | 1 | 2 | 3 |
| MR | 0 | 0 | 0 | 0 | 0 | 0 | 0 | 0 | 0 | 0 | 0 | 0 | 0 | 0 | 0 | 0 |

ALL-DIRECTION GRID CONNECTIONS

8-INPUT 1-OUTPUT SELECTOR

PRESENT INVENTION
(HIERARCHAL LINEAR CONNECTION) CASES WHERE M = 16

PE BLOCK
CONNECTION LINES B0, B1
CONNECTION LINES B0, B1
TRANSFER BUFFER R
TRANSFER BUFFER L
SELECTOR LS
SELECTOR RS
8-INPUT 1-OUTPUT SELECTOR
TRANSFER RESULT BUFFER T

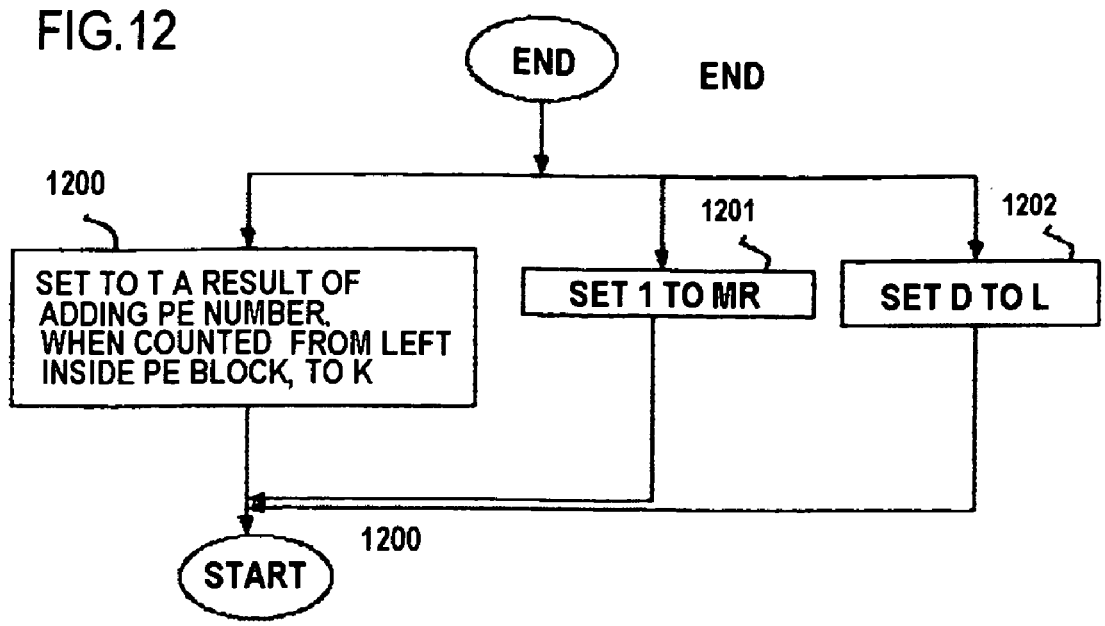

US 7,783,861 B2

DATA REALLOCATION AMONG PES CONNECTED IN BOTH DIRECTIONS TO RESPECTIVE PES IN ADJACENT BLOCKS BY SELECTING FROM INTER-BLOCK AND INTRA BLOCK TRANSFERS

This application is the National Phase of PCT/JP2007/053633, filed Feb. 27, 2007, which claims priority to Japanese Application No. 2006-058302, filed Mar. 3, 2006, the disclosures of which are hereby incorporated by reference in their entirety.

TECHNICAL FIELD

This invention relates to a processor array system in which a plurality of processor elements (PEs) are inter-connected on-chip.

BACKGROUND ART

Heretofore, for image processing of video signals and the like an on-chip linear processor array or a media processor having SIMD (Single Instruction Multiple Data) instructions with a configuration similar to the linear processor array, has been used. For example, in a linear processor array directed to video image recognition processing, disclosed in Non-Patent Document 1, as shown in FIG. 7, an image is inputted in row units sequentially from one edge, and by allocating to adjacent PEs one to several adjacent image sequences, based on SIMD control, each PE implements parallel processing of only the number of PEs, by applying an instruction which has been broadcasted from a control processor (CP) to data in its own local memory.

[Patent Document 1]
JP Patent Kokai Publication No. JP-A-05-342184
[Non-Patent Document 1]
Kyo Shorin, et al., A Video Recognition Processor for Intelligent Cruise Control Based on 128 4-Way VLIW RISC Processing Elements, Technical Report of The Institute of Electronics, Information and Communications Engineers, Integrated Circuits and Devices Research Meeting (ICD), May 2003, Vol. 103, No. 89, pp. 19-24.

SUMMARY OF THE DISCLOSURE

In image processing, particularly in case wherein recognition processing is performed on an image, as in edge detection processing performed on all image elements particularly in a first stage, a state in which data to be processed exist evenly on entire PEs, as the processing progresses, often goes to a state in which the data to be processed are no longer uniform among the PEs.

For example, often in image recognition processing, if in processing up until then several (rectangular) regions within an image are identified as locations in which objects to be recognized exist, only these candidate regions will be targets of subsequent processing. Another characteristic is that there are many cases in which many of these candidate regions, as shown typically in FIG. 8, for example, are found with positional relationships in which they are mutually overlapping. However, as for example in Non-Patent Document 1, in a linear processor array in which data allocation to PEs is performed with image sequences as units, when there is positional overlapping between regions in a sequence direction, normally the amount of processing increases in proportion to the number of overlaps, for a PE (for example, PEN-2 in FIG. 9A) taking on processing of image sequences in which overlapping occurs, in comparison to a PE to which this does not apply, so that loading among the PEs becomes non-uniform, leading to a decrease in processing performance.

In order to eliminate such non-uniformity of processing load, as shown in FIG. 9B, it is necessary to perform reallocation processing of image element data, as if image element data in a plurality of rectangular regions is moved among PEs. In the conventional linear processor array, in order to realize such image element data reallocation processing, if the number of PEs is N, similar to the number of image elements in one line, as shown in FIG. 10, moving N image elements consecutively one by one from PE to PE, via a CP, is a most efficient method.

Set N to counter C (step 1000).
Repeat until the counter C is zero. If the counter C is non-zero in a determination of step 1001, perform the following processing, and if zero, finish.
Read K of PE whose PE number is C (step 1002).
TMP is C+K (step 1003).
Read D of PE whose PE number is TMP (step 1004).
Write D to T of PE whose PE number is C (step 1005).
Set C to C−1 (step 1006), and return to determination of step 1001.

In this case, since the 6 processing steps as shown in 1001 to 1006 of FIG. 10 are repeated N times, there has been a problem in that if step 1000 of FIG. 10 is added a total of 6N+1 steps are necessary to reallocate image elements of one row among PEs, whereby the efficiency is inferior.

As one method of solving this problem, by adopting, not linear connections, for inter-PE connections, but as shown for example in Patent Document 1, by employing a higher dimensional connection configuration such as a two-dimensional truss or a hypercube, an approach in which inter-PE distance is reduced at each step may be conceived.

However, if the number of dimensions of connection is increased, there has been a problem in that the degrees of freedom of layout on a chip decrease, or that wiring distance between PEs becomes longer.

Therefore, it is a principal object of the invention to provide a processor array system which can realize efficient load distribution for processing by high speed reallocation of data of image elements and the like, among PEs.

According to a first aspect of the present invention, there is provided a processor array system which comprises a processor element (referred to below as PE) block array including at least three PE blocks, each of the PE blocks including a plurality (M items) of PEs that perform SIMD operations, characterized in that at least one PE block is connected to at least one other PE block, different from the one PE block, through M number of first signal lines, M being the same as the number of the PEs included in the PE block, each of first signal lines having predetermined bits, and is connected to at least one yet another PE block, different from the one PE block and the other PE block, through M number of second signal lines, each of second signal lines having predetermined bits, and the PEs included in the one PE block comprises a selector means that selects one signal line from among the M number of first signal lines and the M number of second signal lines.

In the present invention, the selector means comprises a first selector means that selects one signal line from the M number of first signal lines, a second selector means that selects one signal line from the M number of second signal lines, and a third selector that selects one signal line from the one signal line selected by the first selector means and the one signal line selected by the second selector means.

In the present invention, a plurality of the PE blocks are connected in a linear connection or a ring connection configuration, with one PE block serving one node, the PE block being inter-connected by the M number of first signal lines to an adjacent PE block on one side of the PE block, and being inter-connected by the M number of second signal lines to an adjacent PE block on the other side of the PE block.

In the present invention, with regard to N number of the PEs (N being a natural number greater than 1), transfer paths are respectively provided in a first transfer direction and a second transfer direction between PEs, which couple PEs at a distance M (M being a natural number greater than 1 and less than N, and a divisor of N); M number of neighboring PEs form one PE block, transfer paths in the first transfer direction from M number of PEs in the PE block constitute the M number of first signal lines, and transfer paths in the second transfer direction from entire M number of PEs in the PE block constitute the M number of second signal lines.

In the present invention, N number of the PEs (N being a natural number greater than 1) are connected in a linear connection or a ring connection configuration, with one PE serving one node; besides connection lines between adjacent PEs, additionally transfer paths are respectively provided in the first transfer direction and the second transfer direction between PEs, inter-connecting PEs provided at a distance M (M being a natural number greater than 1 and less than N, and a divisor of N); M number of neighboring PEs form one PE block, transfer paths in the first transfer direction from M number of PEs in the PE block constitute the M number of first signal lines, and transfer paths in the second transfer direction from the M number of PEs in the PE block constitute the M number of second signal lines.

In the present invention, each PE in the PE block is respectively connected to a PE in an adjacent PE block, provided at a distance of M from each PE, through connection lines in the first transfer direction and connection lines in the second transfer direction provided for entire PEs in the PE blocks.

In the present invention, the each PE includes:

a first transfer buffer means (L) that stores transfer data of a transfer path (B0) in the first transfer direction connecting the PE to a PE located at a distance M from the each PE;

a second transfer buffer means (R) that stores transfer data of a transfer path (B1) in the second transfer direction connecting the PE to a PE located at a distance M from the each PE;

a first selector means (LS) that selects one from among a plurality of the first transfer buffer means in the PE block;

a second selector means (RS) that selects one from among a plurality of the second transfer buffer means in the PE block;

a register means (F) that stores transfer direction information; and a transfer result buffer means (T) that selects, based on a value of the register means (F), whenever an M-distance transfer using a transfer path is performed among entire PEs, at a time when an absolute value of a stored value is decreased by M and the stored value becomes less than M, one of selection results obtained by controlling the first selector means (LS) and the second selector means (RS) with the stored value, and storing the selected result as a result of transfer to the PE.

In the present invention, each PE includes:

a transfer buffer means (L) that stores transfer data of a transfer path in the first transfer direction or the second transfer direction connecting the each PE to a PE at a distance M from the each PE;

a selector means (LS) that selects one from among a plurality of the transfer buffer means (L) in the PE blocks; and a transfer result buffer means (T) that stores as a result of transfer to the PE, whenever an M-distance transfer using a transfer path, is performed among entire PEs, at a time when an absolute value of a stored value is decreased by M and the stored value becomes less than M, a selection result obtained by controlling the selector means (LS), with the stored value.

In the present invention, control is performed such that, in case wherein a grid distance, viewed from a self PE's position, of a PE holding data (D) ultimately reallocated to the self PE, is K (K may have any value such that $-N/2 \leq K \leq N/2$), wherein the right direction or left direction of the self PE is positive, and the opposite thereof is negative, a mask register (MR) for determining operation/non-operation of each PE for participation in a transfer operation is set to operation, and data (D) of the self PE is stored in the first transfer buffer means (L) and the second transfer buffer means (R). When the grid distance (K) is positive, the register means (F) is set to ON, and a result of addition of the grid distance (K) and the self PE number counted from the left or the right in a PE block is stored in the transfer result buffer means (T), and when the grid distance (K) is negative, the register means (F) is set to OFF, and a result of subtraction of the grid distance (K) and the self PE number counted from the right or the left in a PE block is stored in the transfer result buffer means (T).

In the present invention, control is performed such that, in case wherein a grid distance, viewed from a self PE's position of a PE holding data D ultimately reallocated to the self PE, is K (K may have any value such that $0 \leq K \leq N-1$), where the right direction or left direction of the self PE is positive, and the opposite thereof is negative, a mask register (MR) for determining operation/non-operation of each PE for participation in a transfer operation is set to operation. Data (D) of the self PE is stored in the transfer buffer means (L) and a result of addition of the grid distance (K) and the self PE number counted from the left or the right in a PE block, is stored in the transfer result buffer means (T).

In the present invention, a means (control processor CP) is provided to perform control so that, when the register means (F) is ON, if a value T of the transfer result buffer means is greater than or equal to M, a value of T−M is stored in the transfer result buffer means (T), and if the transfer result buffer means (T) is less than M, content of the first transfer buffer means (L) of a PE whose PE number counted from the left in the PE block is T, is selected by the first selector means (LS), to be stored in the transfer result buffer means (T), and the mask register (MR) is set to non-operation, an when the register means (F) is OFF, if the transfer result buffer means (T) is less than or equal to −M, a value of T+M is stored in the transfer result buffer means (T), and if T is greater than −M, content of the second transfer buffer means (R) of a PE whose PE number counted from the right in a PE block is −T is selected by the second selector means (RS), to be stored in the transfer result buffer means (T), and with the mask register (MR) set to non-operation, entire PEs use left connection lines (B0) and right connection lines (B1) to transfer content of the first transfer buffer means (L) and the second transfer buffer means (R) respectively to M-adjacent left and right PEs, and each PE, in which a mask register (MR) is at an operation setting, repeats an operation of storing data transferred from an M adjacent PE on the right and an M adjacent PE on the left respectively to the first transfer buffer means (L) and the second transfer buffer means (R), until mask registers MR of entire PEs become set to non-operation.

In the present invention, a means (control processor CP) is provided to perform control so that, if the transfer result buffer means (T) is greater than or equal to M, a value of T−M is stored in the transfer result buffer means (T), if T is less than M, content of the first transfer buffer means (L) of a PE whose PE number counted from the left in a PE block is T is selected by the first selector means (LS), to be stored in the transfer result buffer means (T). After the mask register (MR) is set to non-operation, entire PEs use left connection lines (B0) to transfer content of the first transfer buffer means (L) to M-adjacent left PEs, and each PE, in which a mask register (MR) is at an operation setting, iterates an operation of storing data transferred from an M-adjacent PE on the right to the first transfer buffer means (L), until mask registers MR of entire PEs become set to non-operation.

According to another aspect of the present invention, there is provided a processor element (below, referred to as "PE") that makes up a processor array system comprising a plurality of PE blocks, each of the PE block including M number of PEs that perform SIMD operations, the system having transfer paths in a first transfer direction and/or a second transfer direction between PEs, for connecting PEs at a distance of M (M being a natural number greater then 1), M being the same as the number of the PEs included in the PE block, wherein the PE includes a selector means that selects one from among a plurality of transfer data to a PE block to which the PE belongs, through a transfer path in the first and/or the second transfer direction.

In the present invention, a PE includes: a first transfer buffer means that stores transfer data of a transfer path in the first transfer direction connecting the PE to a PE at a distance M therefrom; a second transfer buffer means that stores transfer data of a transfer path in the second transfer direction connecting the PE to a PE at a distance M therefrom; a first selector that selects one from among M number of the first transfer buffer means in the PE block; a second selector that selects one from among M of the second transfer buffer means in the PE blocks; a register means that stores transfer direction information; and a transfer result buffer means that selects, based on a value of the register means, whenever an M-distance transfer using a transfer path, is performed among entire PEs, at a time when an absolute value of a stored value is decreased by M and the stored value becomes less than M, any selection result obtained by controlling the first selector and the second selector by the stored value, and storing the selection result as a result of transfer to the PE.

A PE in the present invention is provided with a transfer buffer means that stores transfer data of a transfer path in the first transfer direction or the second transfer direction connecting the PE to a PE at a distance M therefrom, the selector means selecting one from among a plurality of the transfer buffer means that stores transfer data of a transfer path in the first transfer direction or the second transfer direction, and a transfer result buffer means that stores as a result of transfer to the PE, whenever an M-distance transfer using a transfer path, is performed among entire PEs, at a time when an absolute value of a stored value is decreased by M and the stored value becomes less than M, a selection result obtained by controlling the selector means (LS), with the stored value.

According to the present invention, there is provided a system including a plurality of processor element (below referred to as "PE") blocks, each PE block including a plurality of PEs, and being connected linearly or in a ring connection. The PE is connected through a connection line in a first transfer direction, to a PE of another PE block, a predetermined preset distance away from the self PE in the first transfer direction, and connected via a connection line in a second transfer direction opposite to the first transfer direction, to a PE of yet another PE block, a predetermined preset distance away from the self PE in the second transfer direction. The PE includes:

a first and second transfer buffer means which store transfer data of connection lines in the first and the second transfer directions, respectively;

a first selector means that selects one from among the first transfer buffer means of the self PE and the first transfer buffer means of another PE in a PE block to which the self PE belongs;

a second selector means that selects one from among the second transfer buffer means of the self PE and the second transfer buffer means of another PE in the PE block to which the self PE belongs; and a transfer result buffer means that selects according to transfer direction, whenever a transfer operation using the connection lines, is performed between PEs separated by the prescribed distance, at a time when a stored value that is updated by a value of the prescribed distance, and the stored value and the value of the prescribed distance have a predetermined magnitude relationship, one of selection results obtained by controlling the first selector means and the second selector means, with the stored value, and stores the selected result as a result of transfer to the self PE. Alternatively, the PE, being connected to a PE of another PE block via a connection line, a predetermined preset distance away from the self PE, including: a transfer buffer means that stores transfer data of the connection line;

a selector means that selects one from among the transfer buffer means of the self PE and the transfer buffer of another PE in the PE block to which the self PE belongs; and a transfer result buffer means that stores, using the connection line, whenever a transfer operation is performed among PEs separated by the prescribed distance, at a time when a stored value that is a value of the prescribed distance is updated, and the stored value and the value of the prescribed distance have a predetermined magnitude relationship, a selection result obtained by controlling the selector means with the stored value, as a result of transfer to the self PE.

EFFECTS OF THE INVENTION

According to the present invention it is possible to efficiently implement load balancing in processing. The reason for this is that in the present invention, the number of steps required to mutually exchange data of one row (=N items) among PEs can be reduced, without increasing number of dimensions of connections among PEs in a linear processor array system having N number of PEs. According to the invention it is possible to maintain easiness of layout. In addition, according to the invention, it is possible to decrease hardware scale. According to the present invention it is possible to accurately receive data transmitted simultaneously by entre PEs performing synchronous operations under SIMD control, only by information local to a receiving side PE, that is by "grid distance information concerning a self PE and a transmission source PE" or "the self PE number", and network scale (number of bits, complexity) can be reduced.

BRIEF DESCRIPTION OF THE DRAWINGS

FIG. 4 is a flow diagram showing a first half of operations of a preferred mode for implementing the invention.

FIG. 5 is a flow diagram showing a second half of operations of a preferred mode for implementing the invention.

FIG. 6 is a diagram showing a specific example of operations of a preferred mode for implementing the invention.

FIG. 12 is a flow diagram showing a first half of operations of a preferred mode for implementing a second aspect of the present invention.

PREFERRED MODES OF THE INVENTION

The abovementioned present invention is described below in more detail, referring to attached drawings.

First, outline and operation principles of the present invention will be described. In a linear processor array system having N PEs, M is the number of PEs included in a PE block which serves as a layout unit in a chip development, and X is the number of bytes in a unit transfer between PEs.

Figure 1:
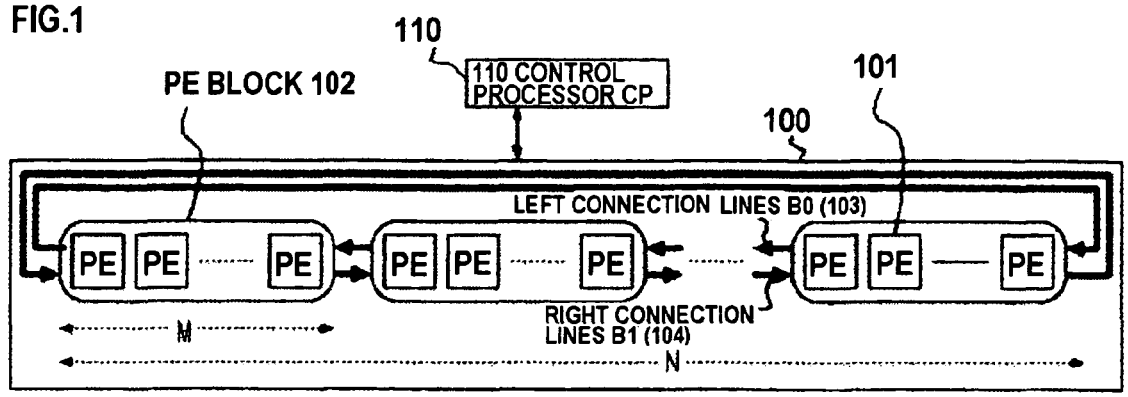
FIG. 1 is a block diagram showing an outline configuration of a linear processor array of the present invention.
Figure 3:
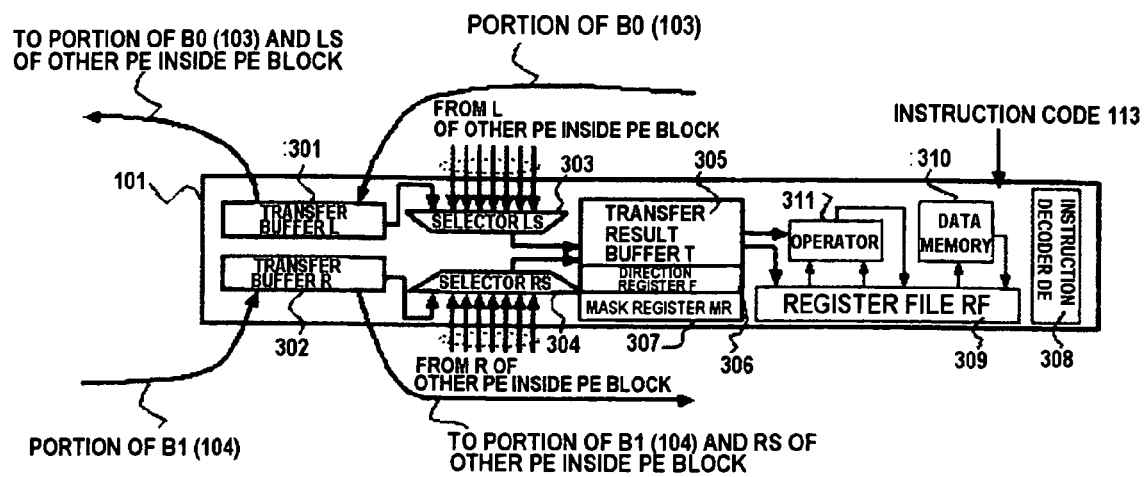
FIG. 3 is a block diagram showing a configuration of a preferred mode for implementing the invention.
Figure 7:
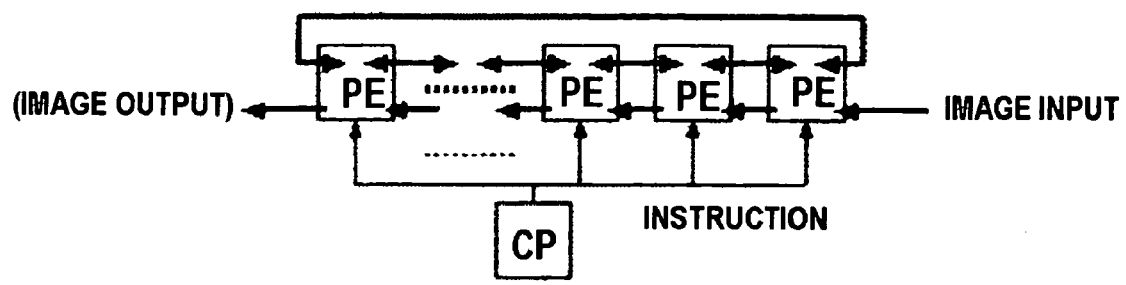
FIG. 7 is a block diagram showing an outline configuration of an existing linear processor array that is background technology.

Referring to FIG. 1 and FIG. 3, a system in the present invention is provided with:

(A) M number of connection line means of X-byte width (left connection lines) B0 (from right to left) and M number of connection line means of X-byte width (right connection lines) B1 (from left to right), when viewed by PE block units, obtained by connecting PEs at distance M, (B) a transfer buffer L and a transfer buffer R for storing data from B0 and B1, present in each respective PE in a PE block, (C) a selector LS and a selector RS of M input and 1 output, for selecting one from among the M number of L- and R-buffers in a PE block, (D) a mask register MR for controlling operation/non-operation of a PE, (E) a transfer result buffer T used for storing a transfer result and as a counter, and (F) a direction register F for storing transfer direction.

By the abovementioned configuration, with a reallocation target being N items of X byte data D, a right direction of a PE as positive and a left direction as negative, and grid distance of a PE in which there exists data D which is going to be reallocated to a PE in question, viewed from the position of the self PE is K (K may have any value such that $-N/2 \leq K \leq N/2$), a control processor CP performs the following control on a PE array (refer to FIG. 4).

First, each PE stores its own data D in the transfer buffers L and R (step 400 in FIG. 4).

When the grid distance K is positive or 0, a result of adding the PE number in question when counted from the left in the PE block, to the grid distance K, is stored in the transfer buffer T (402 in FIG. 4). When the grid distance K is negative, a result of subtracting the PE number in question when counted from the right in the PE block, from the grid distance K, is stored in the transfer buffer T (403 in FIG. 4). The PE array is controlled so that 1 is set to the direction register F when the grid distance K is 0 or greater (402 in FIG. 4), 0 is set to the direction register F when the grid distance K is negative (403 in FIG. 4), and 1 is stored in the mask register MR (405 in FIG. 4).

Next, the control processor CP monitors the mask registers MR of entire PEs, and controls the PE array so that the following operations are repeated in each step until the mask registers MR of entire PEs all become zero.

That is, in PEs in which the mask register MR is non-zero, according to a value of the transfer result buffer T and the direction register F, when the direction register F is 1, if the transfer result buffer T is greater than or equal to M, a value T−M is stored in the transfer result buffer T (step 506 in FIG. 5), if the transfer result buffer T is less than M, content of the transfer buffer L of a PE whose PE number counted from the left in the PE block is T, is selected by the selector LS, and stored in the transfer result buffer T (step 503 in FIG. 5), and the mask register MR is set to zero (step 504 in FIG. 5).

Control is performed so that, when the direction register F is 0, if the transfer result buffer T is less than or equal to −M, a value T+M is stored in the transfer result buffer T (step 511 in FIG. 5), if the transfer result buffer T is greater than −M, content of the transfer buffer R of a PE whose PE number counted from the right in the PE block is −T, is selected by the selector RS, and stored in the transfer result buffer T (step 508 in FIG. 5), and the mask register MR is set to zero (step 509 in FIG. 5). In the transfer result buffer means T, a function of selecting output selected by the selector LS, when the direction register F is 1, and selecting output selected by the selector RS when the direction register F is 0, corresponds to a third selector means of claim 2.

After that, using the connection lines B0 and the connection lines B1, the content of the transfer buffer L and the transfer buffer R are transferred to M-adjacent left and right PEs (steps 505, 510 of FIG. 5), and data transferred from right M-adjacent and left M adjacent PEs are stored respectively in the transfer buffer L and the transfer buffer R.

By the abovementioned configuration and operations, after at most 1+(N÷2M) steps, data of a PE at a distance K from the self PE is stored in the transfer result buffer T of each PE.

Figure 10:
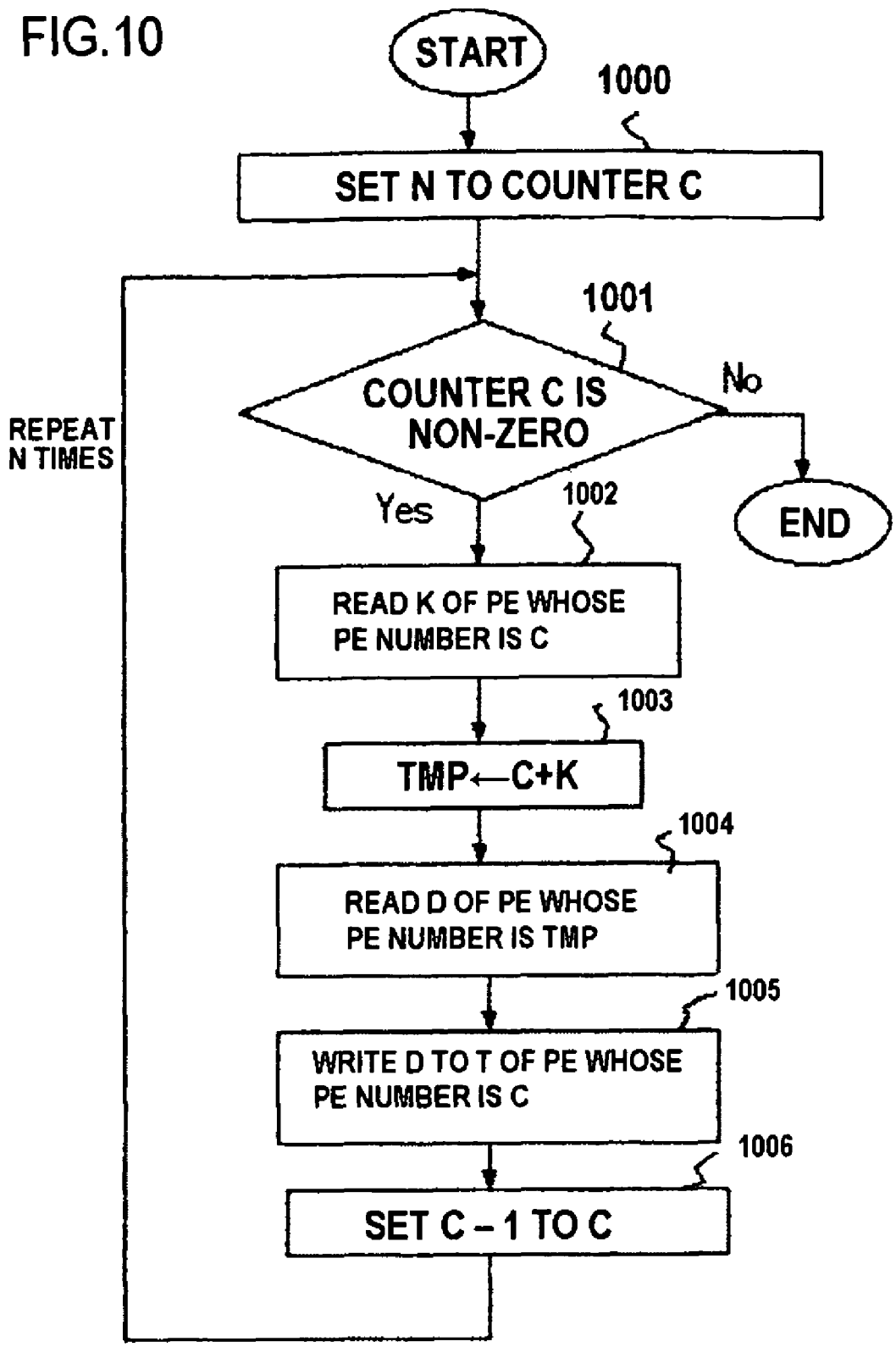
FIG. 10 is a diagram showing flow of operations in conventional technology.

As a result, it is possible to reallocate N items of X byte data that are in 1 row, with about 12M times the efficiency, in comparison to a conventional method shown in FIG. 10.

That is, the present invention is configured such that, as well as having the connection lines B0 and the connection lines B1 between PEs connecting PEs at a distance of M, rather than adjacent PEs as in conventional cases, each PE, in each step among at most (1+(N÷2M)) steps, can extract data to be held, by a simple operation, using the transfer result register T, the direction register F, the transfer buffer L, the transfer buffer S, the selectors LS and RS, and the mask register MR as component elements, from 2M items of data, for each step via a PE block in question, transferred one after another from adjacent PE blocks.

As a result, according to the present invention it is possible to reduce the number of steps needed to reciprocally exchange data of one row (N items) between PEs from a conventional maximum of (1+6N) to a maximum of (1+(N÷2M)), without increasing the number of dimensions of inter-PE connections in a linear processor array system having N PEs.

According to the invention it is possible to maintain easiness of layout. That is, in the invention, from a PE block formed of M PEs being a layout unit, linearity of connections is maintained, and layout on a chip is easier than in cases of multi-dimensional connections.

Figure 8:
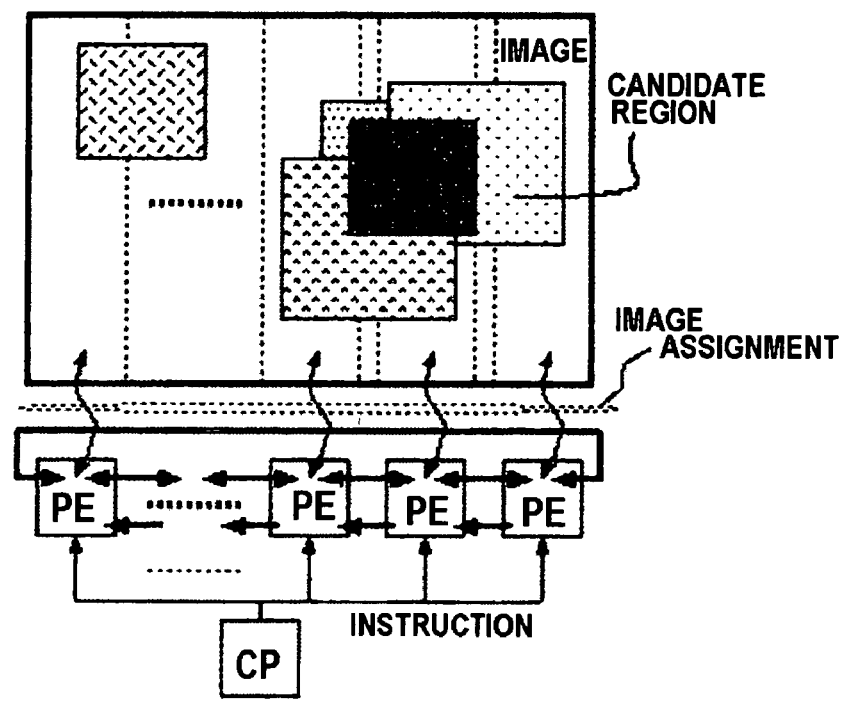
FIG. 8 is a diagram describing a problem to be solved by the present invention.
Figure 9A:
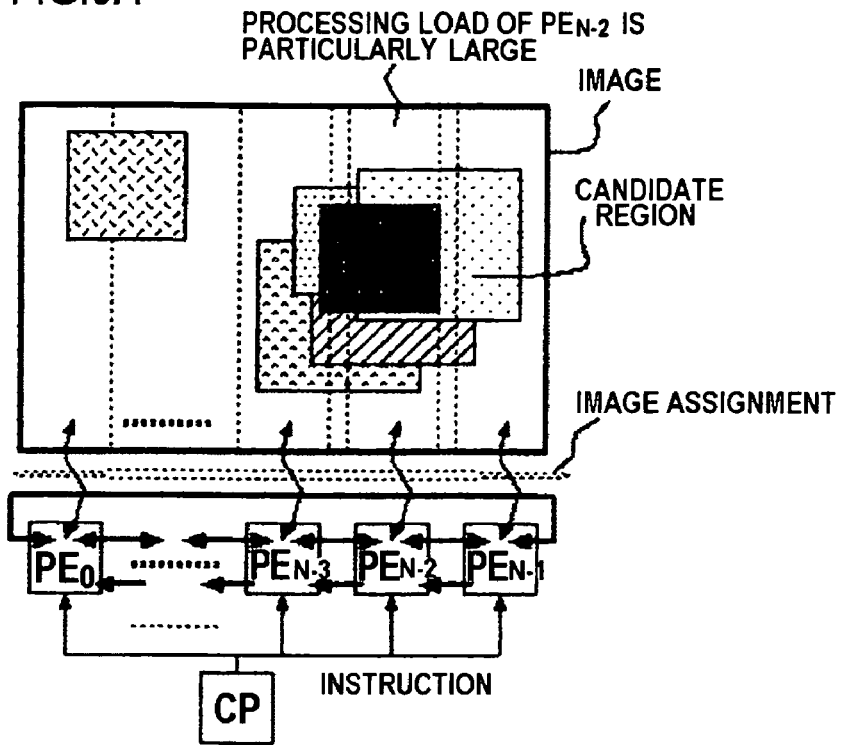
FIG. 9 is a diagram describing a problem to be solved by the present invention.
Figure 9B:
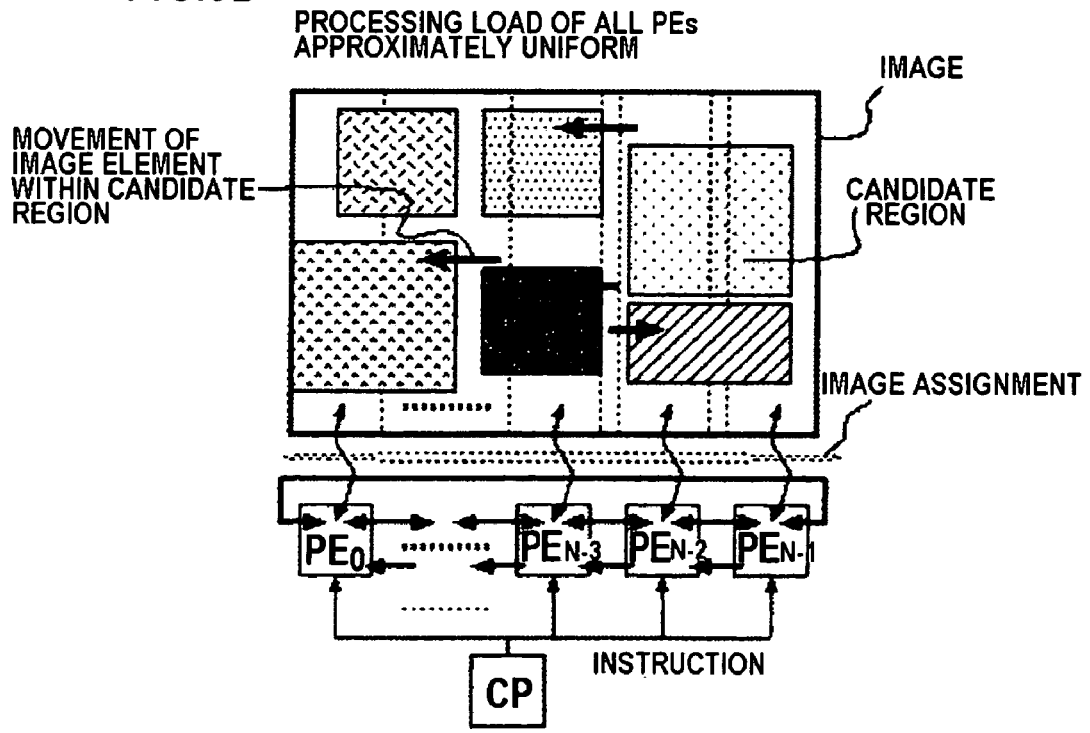
Figure 11A:
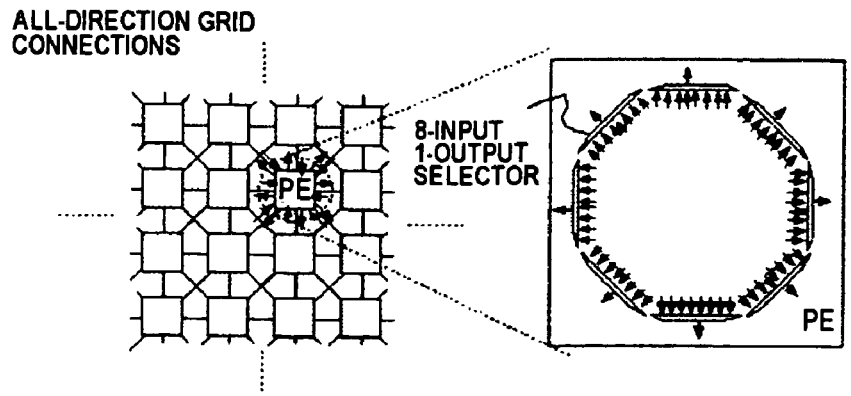
FIG. 11 is a diagram showing one effect of the present invention.
Figure 11B:
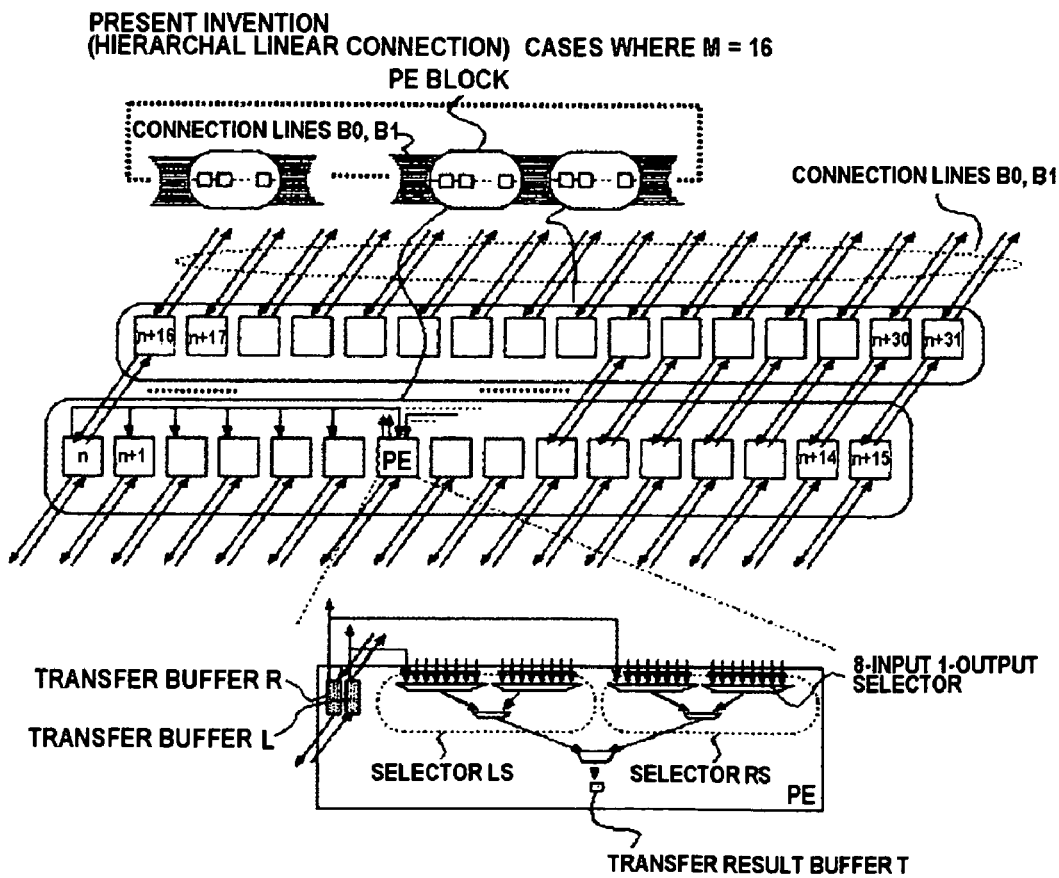

In the present invention, if M=√N, inter-PE data transfer distance is at most approximately √N÷2, and this is equivalent to that of an eight-direction grid connection, which is a typical two-dimensional connection. With regard to size of selector for data transfer necessary for each PE, in cases of eight-direction grid connections, as shown in FIG. 11A, 8 selectors are needed to select 1 from 8 data items, whereas according to the present invention, when N is 1024 (M is 32), 8 selectors are needed similar to the eight-direction grid connection, but when N is less than 1024, for example 256 (M is 16), as shown in FIG. 11B, about half that number, only 4 selectors, are sufficient, so that in a practicable value range of N, it is possible to have smaller hardware scale.

This is because in the present invention, linear connections in which cost of hardware necessary for implementation in which only two transfer directions, left and right, are sufficient, is low, and a local selector for each PE are effectively combined. Below, a description is given concerning an exemplary embodiment.

Referring to FIG. 1, a first exemplary embodiment of the present invention includes a PE array 100 having N number of PEs 101, and a control processor 110 which supplies an instruction to the PE array.

The PE array 100 is provided with (N÷M) number of PE blocks 102, each including M number of PEs 101 (M is a divisor of N), and left connection lines B0 (103, from right to left) and right connection lines B1 (104, from left to right) for connecting adjacent PE blocks.

Figure 2:
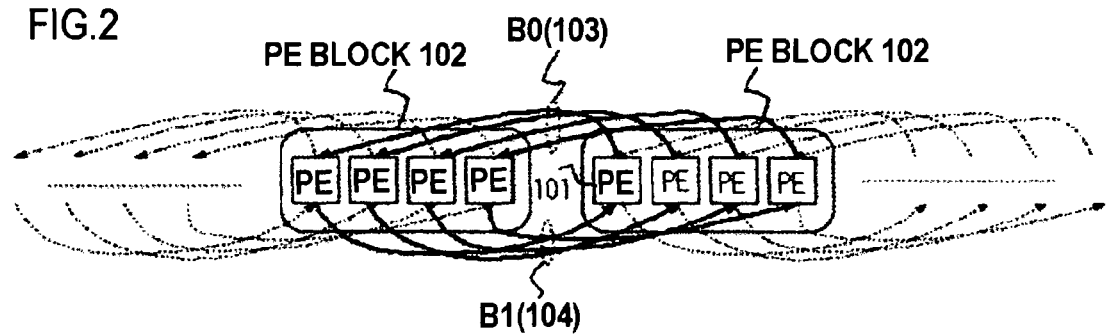
FIG. 2 is a block diagram showing a configuration of connection lines between PE blocks of the linear processor array of the present invention.

Referring to FIG. 2, each PE 101 inside one PE block 102 is connected to a PE at a distance M (in FIG. 2, M is 4) from the self PE in an adjacent PE block 102, and B0 and B1 are collections of connection lines respectively from right to left and from left to right, with regard to entire PEs in the PE block 102.

Referring to FIG. 3, each PE 101 includes: transfer buffer means L (301) and R (302) for storing data transferred by a corresponding portion among B0 and B1, M-input (M is 8 is FIG. 3) 1-output selector means LS (303) and RS (304) for selecting one among the L and R of entire PEs in the PE block 102, a transfer result buffer means T (305) used for storing the transfer result and as a counter, a direction register F (306) for storing transfer direction, and a mask register MR (307) which controls PE operation/non-operation and which is accessible from the control processor CP (110).

The PE 101 normally includes in addition an instruction decoder DE (308), a register file RF (309), a data memory (310), and an operator (311).

The transfer result buffer means T (305) is configured to transfer content thereof to the register file RF (309), to write to the data memory (310), or directly, to be usable as an operand of the operator (311).

These means respectively operate as follows, in outline. When the right direction of a PE is positive and the left direction is negative, grid distance of a PE in which there exists data D scheduled to be reallocated to a PE in question, from the self PE, is K (K may have any value such that −N/2≦K≦N/2). This definition may also be reversed. In the following, outline operations of each means are described based on this definition (left direction of the PE is positive and right direction is negative).

It is assumed that an instruction code 113, "MVSET", is sent from the control processor 110. Each PE 101, with data sent by itself as D, stores D in the transfer buffer means L and R, and MRs of entire PEs are set to 1.

When K is positive, 1 is stored in the direction register F, a result of adding K and the number of the self PE when counted from the left in the PE block, is stored in the transfer result buffer means T; when K is negative, 0 is stored in F, and a subtraction result of K and the number of the self PE when counted from the right in the PE block, is stored in the transfer result buffer means T. Since these operations are simple, they can normally be completed in one step.

When the instruction code 113, "MVLR", is sent from the control processor 110, a PE in which the mask register MR is 1, in case wherein the direction register F is 1, if T is greater than or equal to M, stores a value of T−M in T, and selects content of L of a PE whose PE number is T, when counted from the left inside the block, by LS, to be stored in T, and sets MR to zero.

In case wherein the direction register F is 0, if T is less than or equal to −M, a value of T+M is stored in T, and if T is greater than −M, content of R of a PE whose PE number is −T, when counted from the right inside the block, is selected by RS, to be stored in T, and MR is set to zero.

Next, entire PEs use B0 and B1 to transfer content of L and R to M-adjacent left and right PEs, and data transferred from M-adjacent right and M-adjacent left PEs is respectively stored in L and R. Since these operations are generally simple, they can be completed in one step.

On the other hand, the control processor 110 continues to send the same instruction code "MVLR" each step to PEs, until the MRs of entire PEs become zero.

Next, referring to the flowcharts of FIG. 4 and FIG. 5, overall operation of the present exemplary embodiment will be described in detail.

FIG. 4 is a flowchart for operations implemented by each PE when the instruction code "MVSET" is sent from the control processor 110.

D is set to each of L and R (step 400).

1 is set to MRs of entire PEs (step 405).

A determination is made as to whether or not K is greater than or equal to 0 (step 401).

If K is greater than or equal to 0, 1 is set to the direction register F, and a result of adding the number of the self PE when counted from the left in the PE block, to K is stored in the transfer result buffer T (step 402).

If K is less than 0, 0 is set to the direction register F, and a result of adding the number of the self PE when counted from the right in the PE block, to K is stored in T in the transfer result buffer T (step 403).

Since operations of steps 400 to 405 are simple, they can normally be performed in one step.

FIG. 5 is a flowchart of operations implemented by the control processor 110 and each PE, related to the instruction code "MVLR".

First, the control processor 110 investigates whether or not a PE exists in which the mask register MR is 1 (step 520).

If such a PE exists, the instruction code "MVLR" is sent to the PE array 100 (step 500).

On the PE array side, in the PE in which the mask register MR is 1, a determination is made as to whether or not the direction register F is 1 (step 501).

If the direction register F is 1, operations of steps 502 to 505 are performed, and if the direction register F is 0, operations of steps 507 to 511 are performed.

A determination is made as to whether or not the transfer result buffer T is less than M (step 502).

If the transfer result buffer T is less than M, the L of the PE whose PE number counted from the left in the PE block is T, is selected by the LS, and stored in the transfer result buffer T (step 503).

The mask register MR is set to 0 (step 504).

Using the connection lines B0, data inside the L is transferred to the transfer buffer L of a PE that is apart by a distance M in the left direction (step 505).

If T is greater than or equal to M, the transfer result buffer T is updated to T−M (step 506).

A determination is made as to whether or not T is greater than −M (step 507).

If T is greater than −M, the R of a PE whose PE number counted from the right in the PE block is −T, is selected by the RS, and stored in the transfer result buffer T (step 508).

The mask register MR is set to 0 (step 509).

Using the connection lines B1, data inside the R is transferred to the transfer buffer R of a PE that is apart by a distance M in the right direction (step 510).

If T is less than or equal to −M, the transfer result buffer T is updated to T+M (step 511).

Since operations of steps 501 to 511 are simple, they can normally be performed in one step.

Next, an effect of the present exemplary embodiment is described.

In the present exemplary embodiment, since PEs are connected in both directions at a distance M, when the number of PEs is N, N items of transfer data D sent from all of the PEs can go through 1+(N÷2M) steps to pass all of the PE blocks.

In the present exemplary embodiment, since in addition each PE is provided with the selectors LS and RS for selecting one from among content of the transfer buffers L and R possessed by the M number of PEs in the PE block, and the transfer result buffer T which has a role of counter indicating timing at which these should be used, it is possible to select necessary items with efficient timing at a prescribed step, from among a group of transfer data D that passes through each PE block from right to left and from left to right, using B0 or B1, to be taken into the T of the self PE.

In the present exemplary embodiment, since processing is stopped when entire PEs have obtained transfer data using the mask register MRs, it is possible in even more cases to complete all operations in a number of steps smaller than 1+(N÷2M).

Next, a detailed description concerning a second exemplary embodiment of the present invention will be given referring to the drawings. Referring to FIG. 1, FIG. 2, and FIG. 3, outside of the fact that the right connection lines B1, as in FIG. 1 and FIG. 2, do not exist, and the fact that the transfer buffer R, the selector RS, the direction register F, and the right connection lines B1, as in FIG. 3, do not exist, the second exemplary embodiment of the present invention has a similar configuration to the first exemplary embodiment of the present invention. These means operate generally as follows. A grid distance, viewed in a right direction from a self PE's position of a PE in which there exists data D scheduled to be reallocated to the PE itself, is K (K may have any value such that 0≦K≦N−1).

It is assumed that an instruction code 113, "MVSET", is sent from the control processor 110. For each PE 101, data sent by the self PE is D.

D is stored in a transfer buffer means L, MRs of entire PEs are set to 1, and a result of adding K and the number of the self PE when counted from the left in a PE block is stored in a transfer result buffer means T. Since these operations are generally simple, they can be completed in one step.

When an instruction code 113, "MVLR", is sent from the control processor 110, a PE whose MR is non-zero if T is greater than or equal to M, stores a value T−M in a transfer result buffer T, and if T is less than M, selects content of a PE whose PE number counted from the let in a block is T, by an LS, to be stored in the transfer result buffer T, and sets a mask register MT to zero.

Next, entire PEs use B0 to transfer content of L to M-adjacent left PEs, and store data transferred from M-adjacent right PEs in L.

Since these operations are generally simple, they can be completed in one step.

On the other hand, a control processor 110 continues to send the same instruction code "MVLR" each cycle to PEs, until MRs of entire PEs become zero.

Next, referring to flowcharts of FIG. 12 and FIG. 13, overall operations of the second exemplary embodiment of the present invention will be described in detail.

FIG. 12 is a flowchart for describing operations implemented by each PE when the instruction code "MVSET" is sent from the control processor 110.

D is set to each transfer buffer L (step 1202).

1 is set to the mask registers MR of entire PEs (step 1201).

A result of adding to K the number of a PE when counted from the left in a PE block is stored in the transfer result buffer T (step 1200).

Since operations of steps 1200 to 1202 are simple, normally they can be performed in one step.

Figure 13:
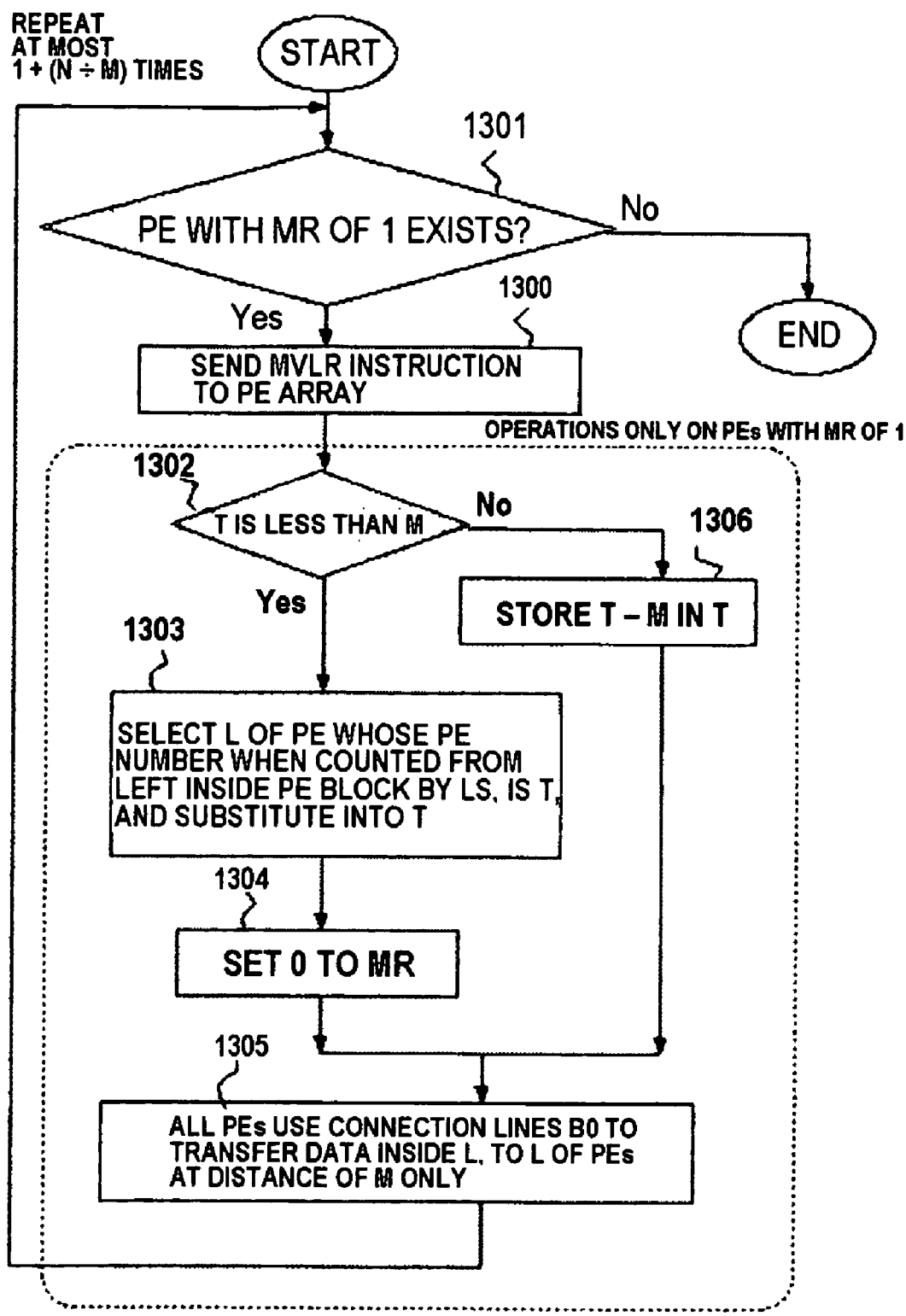
FIG. 13 is a flow diagram showing a second half of operations of a preferred mode for implementing a second aspect of the present invention.

FIG. 13 is a flowchart for describing operations implemented by the control processor 110 and each PE, related to the instruction code "MVLR".

First, the control processor 110 investigates whether or not a PE exists in which MR is 1 (1301), and if such a PE exists, sends the instruction code "MVLR" to the PE array 100 (step 1300).

On a PE array side, in the PE whose MR is 1, a determination is made as to whether or not a transfer result buffer T is less than M (step 1302).

If the transfer result buffer T is less than M, L of a PE whose PE number counted from the left in a PE block is T, is selected by the selector LS, and stored in the transfer result buffer T (step 1303).

MR is set to 0 (step 1304), and after that, using the connection lines B0, data inside L is transferred to a transfer buffer L of a PE at a distance of M only, in the left direction (step 1305).

If T is greater than or equal to M, the transfer result buffer T is updated to T−M (step 1306).

Since operations of steps 1302 to 1306 are simple, normally they can be performed in one step.

Next, an effect of the second exemplary embodiment of the present invention is described.

In the present exemplary embodiment, since PEs are connected at a distance M, when the number of PEs is N, N items of transfer data D sent from all of the PEs go through 1+(N÷M) steps to be able to pass all of the PE blocks.

In the present exemplary embodiment, since in addition each PE is provided with the transfer result buffer T that has a role of counter indicating timing at which the selectors LS and RS for selecting one from among content of the transfer buffer L possessed by M number of PEs in the PE block, should be used, it is possible to select necessary items with efficient timing at a prescribed step, from among a group of transfer data D that passes through each PE block from right to left, using B0, to be taken into the T of the self PE.

In the present exemplary embodiment, since processing is stopped when entire PEs have obtained transfer data using the mask registers MR, it is possible in even more cases to complete all operations in a number of steps small than 1+(N÷M).

In the second exemplary embodiment of the present invention, in comparison to the first exemplary embodiment, the number of steps needed in reallocation of N image elements of one row among PEs increases by approximately a factor of 2, but since component elements are fewer, there is an effect in that the increase in hardware scale is smaller.

EXAMPLE

Next a description will be given according to a specific example. FIG. 6 is a drawing for specifically describing operation of the present invention as described above.

FIG. 6A, in each column, represents settings in one PE, with N being 16, and M being 4. For simplicity, in case wherein the PE number is set to sent data D and arbitrary values of −8 to 7 are set as a distance value K to a transfer origin PE, each PE shows a result in which values of F, T, L, R, and MR are set, using K or a PE number from the right and the left inside a block, as in the flowchart of FIG. 4, immediately after issuing an MVSET instruction.

Here, it is understood that a T field of FIG. 6A is obtained by subtraction when K is negative and addition when positive of K belonging to the same column and content of a hatched box of each column. For example, T=−6 of the first column is obtained by subtraction of PE#=3 from the right inside a block, and K=−3, and the third column of T=4 is obtained by addition of K=2 and PE#=2 from the left inside the block.

FIG. 6B to FIG. 6D respectively show states after performing 1 to 3 repetitions of an MVLR instruction (note that L and R show values before updating) in tabular form corresponding to FIG. 6A.

In FIG. 6B to FIG. 6D, according to the flowchart of FIG. 5, by an absolute value of T being less than M, in a PE in which a value of the transfer buffer L or R is stored in the transfer result buffer T, the network is implemented and shown in a T box and an MR field.

From FIG. 6, it is understood that after a value of D in a PE positioned at a distance indicated by K undergoes 3 repetitions (=1+16/(4×2)) of an operation indicated in the flowchart of FIG. 5, it is stored in the transfer result buffer T (refer to T field of FIG. 6D).

FIG. 6E represents a manner (distance and direction) of data movement among PEs performed during from FIG. 6B to FIG. 6D, by arrows.

According to the present invention, by providing a linear processor array in which reallocation of data among PEs is possible at high speed, application is possible in which processor load is distributed among the PEs and performance of the linear processor array is improved. In addition, application is possible not only of distribution of processor load, but also enlargements, contractions, and modifications of images mapped to each PE of the linear processor array. A description of the present invention has been given above according to the abovementioned exemplary embodiments, but the present invention is not limited only to the abovementioned exemplary embodiments, and the invention clearly includes all types of transformations and modifications that may be realized by a person skilled in the field within the scope of the present invention.

The invention claimed is:

1. A processor array system comprising
a processor element (referred to below as PE) block array including at least three PE blocks, each of the PE blocks including a plurality (M items) of PEs that perform SIMD operations,
wherein the M items of PEs that make up at least one PE block are connectable to the M items of PEs that make up at least one other PE block different from the one PE block via a first transfer buffer of the at least one PE block, through M number of first signal lines, each of the first signal lines having predetermined bits, M being the same as the number of the PEs included in the PE block, and the M items of PEs that make up the one PE block are connectable to the M items of PEs that make up at least one yet another PE block different from the one PE block and the other PE block via a second transfer buffer of the at least one PE block, through M number of second signal lines, each of the second lines having predetermined bits; and one of the M PEs included in the one PE block comprises a selector circuit that selects, based on control signals derived from a direction register and a mask register that are provided to the selector circuit,
wherein signals output at least one of the other M−1 PEs of the at least one PE block are provided to the selector circuit of the at least one PE block, together with the first signal lines and the second signal lines respectively output from the first and second transfer buffers,
wherein the selector circuit comprises:
a first selector that selects one signal line from one of the M number of first signal lines and the signals output from at least one of the other M−1 PEs of the at least one PE block;
a second selector that selects one signal line from one of the M number of second signal lines and the signals output from at least one of the other M−1 PEs of the at least one PE block; and
a third selector that selects one signal line from the one signal line selected by the first selector and the one signal line selected by the second selector.

2. The processor array system according to claim 1, wherein a plurality of the PE blocks are connected in a linear connection or a ring connection configuration, with one PE block serving as one node, the PE block being connected through the M number of first signal lines to an adjacent PE block on one side of the PE block, and connected through the M number of second signal lines to an adjacent PE block on another side of the PE block.

3. The processor array system according to claim 1, wherein,
with regard to N number of the PEs (N being a natural number greater than 1), transfer paths are respectively provided in a first transfer direction and a second transfer direction between PEs, connecting PEs provided at a distance M (M being a natural number greater than 1 and less than N, and a divisor of N),
M number of neighboring PEs form one PE block,
transfer paths in the first transfer direction from M number of PEs in the PE block form the M number of first signal lines, and transfer paths in the second transfer direction from M number of PEs in the PE block form the M number of second signal lines.

4. The processor array system according to claim 3, wherein
N number of the PEs (N being a natural number greater than 1) are connected in a linear connection or a ring connection configuration, with one PE block serving as one node,
besides connection lines between adjacent PEs, additionally transfer paths are respectively provided in the first transfer direction and the second transfer direction between PEs, connecting PEs at a distance M (M being a natural number greater than 1 and less than N, and a divisor of N),
M number of neighboring PEs form one PE block,
transfer paths in a first transfer direction from M number of PEs in the PE block form the M number of first signal lines, and
transfer paths in a second transfer direction from M number of PEs in the PE block form the M number of second signal lines.

5. The processor array system according to claim 2, wherein each PE in the PE block is respectively connected to a PE which is in an adjacent PE block and is at a distance M from the each PE, through connection lines in a first transfer direction and connection lines in a second transfer direction provided for entire PEs in the PE block.

6. The processor array system according to claim 3, wherein each of the PEs includes:
a first transfer buffer that stores transfer data of a transfer path in the first transfer direction connecting the PE to a PE at a distance M from the each PE;
a second transfer buffer that stores transfer data of a transfer path in the second transfer direction connecting the PE to a PE at a distance M from the each PE;
a first selector that selects one from among a plurality of the first transfer buffer in the PE block;
a second selector that selects one from among a plurality of the second transfer buffer in the PE block;
a register that stores transfer direction information; and
a transfer result buffer that selects, based on a value of the register, whenever an M-distance transfer using a transfer path, is performed among entire PEs, at a time when an absolute value of a stored value is decreased by M and the stored value becomes less than M, one of any selection results obtained by controlling the first selector and the second selector with the stored value, and stores the selected one as a result of transfer to the PE.

7. The processor array system according to claim 3, wherein each of the PEs includes:
a transfer buffer that stores transfer data of a transfer path in the first transfer direction or the second transfer direction, connecting the PE to a PE at a distance M from the each PE;
a selector that selects one from among a plurality of the transfer buffer in the PE block; and
a transfer result buffer that stores as a result of transfer to the PE, whenever an M-distance transfer using a transfer path, is performed among entire PEs, at a time when an absolute value of a stored value is decreased by M and the stored value is less than M, a selection result obtained by controlling the selector with the stored value.

8. The processor array system according to claim 6, wherein,
in case wherein a grid distance, viewed from a self PE's position, of a PE holding data D which is ultimately reallocated to the self PE, is K (K may have any value such that $-N/2 \leqq K \leqq N/2$), where one of the first transfer direction or the second transfer direction of the self PE is a positive transfer direction, and another is a negative transfer direction,
a mask register for determining operation/non-operation of each PE for participation in a transfer operation is set to operation,
data of the self PE is stored in the first transfer buffer and the second transfer buffer,
when the grid distance is positive, the register is set to ON, and a result of addition of the grid distance and the self PE number counted from the first or the second transfer direction side in a PE block is stored in the transfer result buffer, and
when the grid distance is negative, the register is set to OFF, and a result of subtraction of the grid distance and the self PE number counted from the first or the second transfer direction side in a PE block is stored in the transfer result buffer.

9. The processor array system according to claim 7, wherein,
in case wherein a grid distance, viewed from a self PE's position of a PE holding data which is ultimately reallocated to the self PE, is K (K may have any value such that $0 \leqq K \leqq N-1$), where one of the first transfer direction or the second transfer direction of the self PE is a positive transfer direction, and another is a negative transfer direction, a mask register for determining operation/non-operation of each PE for participation in a transfer operation is set to operation,
data of the self PE is stored in the transfer buffer, and
a result of addition of the grid distance and the self PE number counted from the first or the second transfer direction side in a PE block, is stored in the transfer result buffer.

10. The processor array system according to claim 6, comprising a unit that performs control so that,
in case the register is ON,
if a value T of the transfer result buffer is greater than or equal to M, a value of T−M is stored in the transfer result buffer, and
if a value T of the transfer result buffer is less than M, content of the first and the second transfer buffer of a PE whose PE number counted from one of the second transfer direction in a PE block is T, is selected by the first selector, to be stored in the transfer result buffer, and the mask register is set to non-operation;
in case the register is OFF,
if a value T of the transfer result buffer is less than or equal to −M, a value of T+M is stored in the transfer result buffer, and
if T is greater than −M, content of the second transfer buffer of a PE whose PE number counted from one of the first and the second transfer directions in a PE block is −T, is selected by the second selector, to be stored in the transfer result buffer, and the mask register is set to non-operation; and
entire PEs use connection lines in the first transfer direction and connection lines in the second transfer direction to transfer contents of the first transfer buffer and the second transfer buffer to M adjacent PEs in the first and the second transfer directions, respectively, and each PE, in which the mask register is being set to an operation, repeats an operation of storing data transferred from an M-adjacent PE in the first transfer direction and an M-adjacent PE in the second transfer direction to the first transfer buffer and the second transfer buffer, respectively, until mask registers of entire PEs become set to non-operation.

11. The processor array system according to claim 7, including a unit that performs control so that,
if a value T of the transfer result buffer is greater than or equal to M, a value of T−M is stored in the transfer result buffer,
if T is less than M, content of the first transfer buffer of a PE whose PE number counted from one of the first and the second transfer directions in a PE block is T, is selected by the first selector, to be stored in the transfer result buffer, and the mask register is set to non-operation, and
entire PEs use connection lines in the first transfer direction to transfer content of the first transfer buffer to M adjacent PEs in the first transfer direction and each PE, in which the mask register is at an operation setting, repeats an operation of storing data transferred from M adjacent PEs in the second transfer direction to the first transfer buffer, until the mask registers of entire PEs become set to non-operation.

12. A processor element (below, referred to as "PE") that constitutes a processor array system including a plurality of PE blocks, each of the PE blocks including M number of PEs that perform SIMD operations, and transfer paths in a first transfer direction and/or a second transfer direction between PEs, connecting PEs provided at a distance of M (M being a natural number greater than 1), M being the same as the number of the PEs included in the PE block,
wherein the PE includes:
a first transfer buffer that stores transfer data of a transfer path in the first transfer direction connecting the PE to a PE provided at a distance M from the PE;
a second transfer buffer that stores transfer data of a transfer path in the second transfer direction connecting the PE to a PE provided at a distance M from the PE;
a selector that selects, based on control signals provided to the selector, one from among a plurality of transfer data to a PE block to which the PE belongs, through a transfer path in the first transfer direction and/or the second transfer direction;
the selector including a first selector that selects one from among M number of the first transfer buffer in the PE block;
the selector including a second selector that selects one from among M number of the second transfer buffer in the PE block;
a register that stores transfer direction information that is used to obtain the control signals provided to the first and second selectors; and
a transfer result buffer that selects, based on a value of the register, whenever an M-distance transfer using a transfer path is performed among entire PEs, at a time when an absolute value of a stored value is decreased by M and the stored value becomes less than M, one of selection results obtained by controlling the first selector and the second selector with the stored value, and storing the selection result as a result of transfer to the PE, and
wherein the PE blocks are connected to each other in a linear connection or a ring connection, and
wherein signals output from at least one of the other M−1 PEs in the same block as the PE are provided as inputs to the first and second selectors, together with the transfer data respectively output from the first and second transfer buffers.

13. A processor array system including a plurality of processor element (below referred to as "PE") blocks, each of PE blocks including a plurality of PEs, the plurality of PE blocks being connected to each other in a linear connection or a ring connection configuration,
wherein the PE is connected through a connection line in a first transfer direction to a PE of another PE block, separated at a predetermined preset distance from a self PE in the first transfer direction, and connected through a connection line in a second transfer direction opposite to the first transfer direction, to a PE of yet another PE block, separated at a predetermined preset distance from the self PE in the second transfer direction;
the PE including:
first and second transfer buffer which respectively store transfer data of connection lines in the first and the second transfer directions;
a first selector that selects, based on control signals provided to the first selector, one from among the first transfer buffer of a self PE and the first transfer buffer of another PE in a PE block to which the self PE belongs, the control signals derived from information stored in a mask register and a transfer direction register;
a second selector that selects, based on the control signals provided to the second selector, one from among the second transfer buffer of the self PE and the second transfer buffer of another PE in the PE block to which the self PE belongs; and
a transfer result buffer that selects, according to transfer direction, whenever a transfer operation using the connection lines, is performed between PEs separated by the prescribed distance, at a time when a stored value is updated by a value of the prescribed distance, and the stored value and the value of the prescribed distance have a predetermined magnitude relationship, one of selection results obtained by controlling the first selector and the second selector, with the stored value, and stores the selected result as a result of transfer to the self PE, and
wherein signals output from at least one of the other M−1 PEs in a same block as the self PE are provided as inputs to the first and second selectors, together with the transfer data respectively output from the first and second transfer buffers.

14. A processor array system comprising a plurality of processor element (below referred to as "PE") blocks, each of the PE blocks including a plurality of PEs, the plurality of PE blocks being connected to each other linearly or connected in a ring,
wherein the PE is connected through connection lines to PEs of other PE blocks, separated at a predetermined preset distance from a self PE by one of M number of first signal lines in one direction and by one of M number of second signal lines in other direction,
the PE including:
a first transfer and a second transfer buffer that stores transfer data of the connection lines;
a selector that selects, based on control signals provided thereto, one from among the transfer buffers of the self PE and the transfer buffers of another PE in a PE block to which the self PE belongs, the control signals derived from information stored in a mask register and a transfer direction register; and
a transfer result buffer that stores, as a result of transfer to the self PE, whenever a transfer operation using the connection lines, is performed between PEs separated by the prescribed distance, at a time when a stored value is updated by a value of the prescribed distance, and the stored value and the value of the prescribed distance have a predetermined magnitude relationship, a selection result obtained by controlling the selector with the stored value, and wherein signals output from at least one other PE in a same block as the PE are provided as inputs to the selector, together with the transfer data output from the transfer buffers, wherein the selector comprises:
 a first selector that selects one signal line from one of M number of first signal lines and signals output from at least one of the other PEs of the PE block to which the self PE belongs; and
 a second selector that selects one signal line from one of M number of second signal lines and signals output from at least one of the other PEs of the PE block to which the self PE belongs.

\* \* \* \* \*